Patented Jan. 22, 1929.

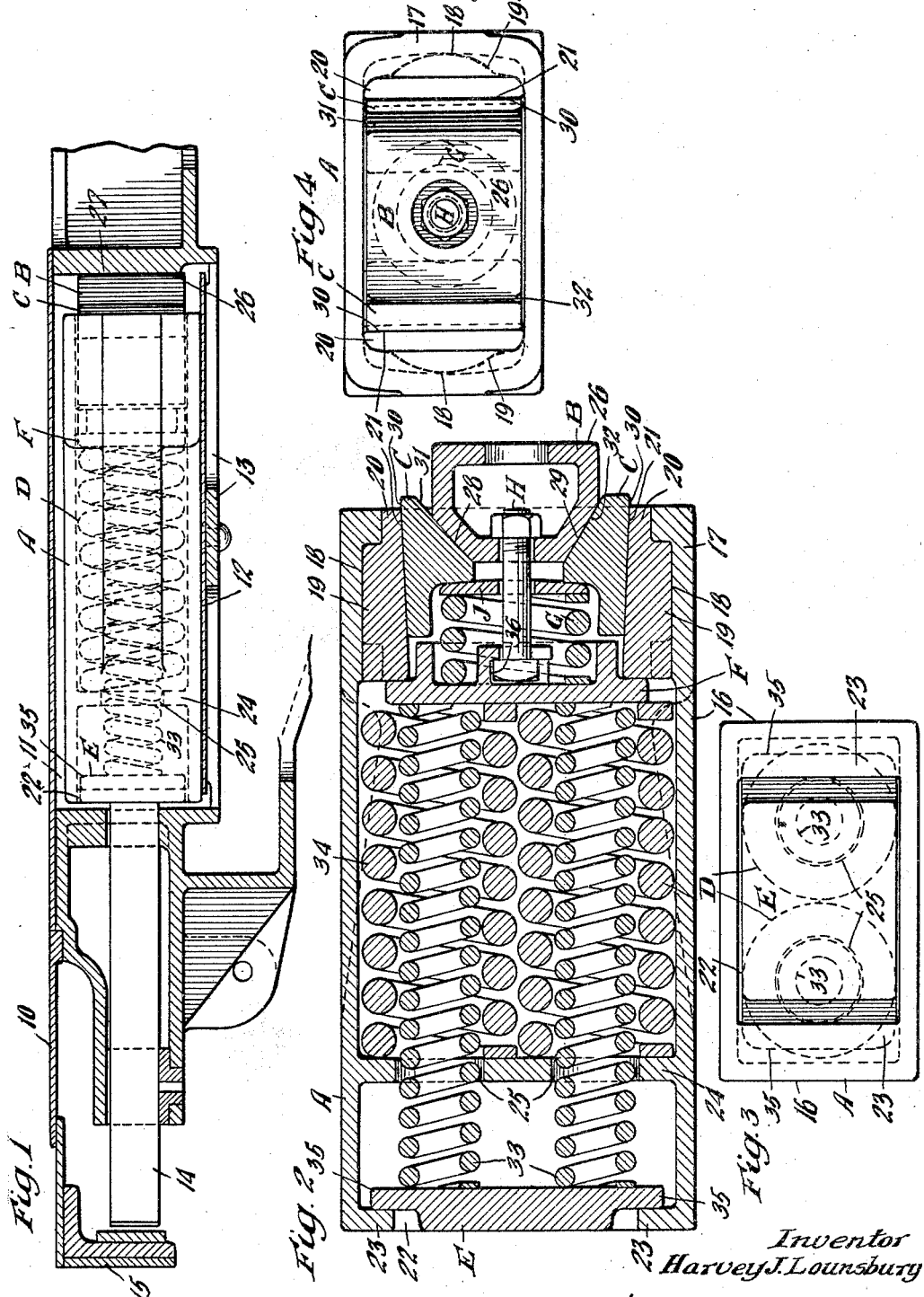

1,699,795

UNITED STATES PATENT OFFICE.

HARVEY J. LOUNSBURY, OF GLEN ELLYN, ILLINOIS, ASSIGNOR TO W. H. MINER, INC., OF CHICAGO, ILLINOIS, A CORPORATION OF DELAWARE.

BUFFING MECHANISM.

Application filed July 29, 1927. Serial No. 209,245.

This invention relates to improvements in buffing mechanisms.

One object of the invention is to provide a buffing mechanism, especially adapted for railway cars, including a friction mechanism resisted by spring means, wherein the spring means also acts to provide for free spring resistance to absorb the buffing shocks.

A more specific object of the invention is to provide in a buffing mechanism a shock absorber including a friction casing having friction elements cooperating therewith and a main spring resistance within the casing cooperating with the friction elements, the main spring resistance comprising a plurality of members all of which oppose movement of the friction means, and certain of which in addition provide free spring resistance during the first part of the compression stroke of the shock absorber to take care of the lighter buffing shocks.

Other objects of the invention will more clearly appear from the description and claims hereinafter following.

In the drawings, forming a part of this specification, Figure 1 is a vertical, longitudinal sectional view taken centrally through the platform of a railway car illustrating my improvements in connection therewith. Figure 2 is a horizontal, longitudinal sectional view through the shock absorber of my improved mechanism. Figure 3 is a front end elevational view of the shock absorbing mechanism proper. And Figure 4 is a rear end elevational view thereof.

In said drawings, 10 indicates the end platform of a passenger car provided with the usual pocket 11 in which the shock absorber proper is mounted. The shock absorber is supported in operative position by the usual wear plate 12 extending longitudinally of the pocket and secured by rivets to the underframe 13 of the car. The ordinary buffer stem is indicated by 14, the same being slidably mounted and having the rear end thereof cooperating with the shock absorber. The front end of the buffer stem 14 cooperates with the buffing platform 15 of the car. The platform 15 is supported in the usual manner by side stems, not shown.

The shock absorber proper of my improved mechanism comprises broadly a casing A; a wedge block B; two friction shoes C—C; twin arranged main spring resistance elements D—D; spring followers E and F; an auxiliary spring resistance G; a retainer bolt H; and an auxiliary spring follower J.

The casing A is in the form of a substantially rectangular box-like casting open at the opposite ends. The side walls of the casing are designated by 16, and as most clearly shown in Figure 2, the rear end portions of these walls are inwardly thickened as indicated at 17. The thickened sections 17 of the side walls are recessed as indicated at 18 to receive enlargements 19 on the outer sides of interior liners 20 to anchor the liners to the casing A against longitudinal movement. The liners 20 present opposed inwardly converging flat friction surfaces 21. The front end of the casing A is provided with an opening 22, the opening being of lesser width than the interior of the casing, the side walls being provided with inturned sections 23 forming limiting stops to limit outward movement of the spring follower E. Inwardly of the limiting stops 23 the casing is provided with a transverse partition wall 24 which serves as abutment means for limiting inward movement of the spring follower and also as abutment means for the front end of certain of the members of the spring resistance means D. The partition wall 24 is provided with a pair of openings 25—25 for a purpose hereinafter pointed out.

The wedge block B is in the form of a hollow cored member having a transverse rear abutment face 26 adapted to co-operate with an inner abutment face 27 of the buffer pocket proper. At the forward end the wedge block B is provided with a pair of wedge faces 28 and 29, the wedge face 28 being disposed at a relatively blunt angle with respect to the longitudinal axis of the shock absorber and the wedge face 29 being disposed at a relatively keen angle with respect to said axis.

The friction shoes C—C are of similar design, except as hereinafter pointed out. Each of the friction shoes C is provided with an outer friction surface 30 adapted to cooperate with the friction surface 21 of the corresponding liner 20. On the inner side each friction shoe is provided with a lateral enlargement having a wedge face on the outer side thereof cooperating with one of the wedge faces of the wedge block B. The wedge face of the shoe C which cooperates with the wedge face 28 of the block B is designated by 31 and the wedge face of the shoe C, which cooperates with the wedge face 29 of the wedge block B is designated by 32.

The twin arranged main spring resistance elements D are disposed within the casing A. Each element of the twin arranged spring resistance means D comprises an inner coil member 33 and an outer coil member 34. The coil member 34 is heavier than the inner coil member, as clearly shown in Figure 2. The inner coil members 33 are of considerably greater length than the outer coil members 34 and extend through the openings 25 of the partition wall 24 and have their forward end bearing directly on the spring follower E. Both coils 33 and 34 of the twin spring resistance elements D have their rear ends bearing on the spring follower F. The forward ends of the outer coils 34 of the spring resistance means D bear directly on the partition wall 24.

The spring follower E is in the form of a substantially rectangular plate cut away at opposite sides to present wing-like extensions 35 adapted to engage in back of the abutment members 23 to limit outward movement of the spring follower and hold the same assembled with the casing. The outer face of the spring follower E bears directly on the inner end of the buffer stem 14.

The spring follower F is also in the form of a substantially rectangular plate and is of such a width that the opposite side portions thereof bear on the front ends of the liners 20, thereby limiting rearward movement of the spring follower F.

The auxiliary spring resistance G is interposed between the spring follower F and the auxiliary spring follower disc J, which bears directly on the enlargements of the friction shoes C—C.

The wedge block B is anchored to the spring follower F by the retainer bolt H which has the head thereof disposed within a pocket 36 at the front side of the spring follower F and the nut thereof disposed within the hollow portion of the wedge block B. The retainer bolt H holds the friction system assembled with the casing. As most clearly shown in Figure 2 in the normal position of the parts, the friction shoes C are slightly spaced from the front end of the spring follower F, thereby permitting a certain amount of relative movement when the mechanism is operated to assure the setting up of the wedging action.

The operation of my improved buffing mechanism is as follows: The buffing stem 14 is moved inwardly toward the shock absorbing mechanism by engagement of the buffer plate 15 with the outer end of the stem, the buffer plate being in turn actuated by engagement with a corresponding buffer plate on the adjacent car. Upon inward movement of the stem 14 the spring follower E will be forced inwardly of the casing A, thereby compressing the coils 33 of the twin spring resistance means. Due to the high capacity of the springs 34 and the frictional resistance between the friction shoes C and the friction surfaces of the casing A, there will be substantially no movement of the friction means with respect to the casing, the springs 33 only being compressed during the first part of the buffing action. It will be evident that the mechanism thus affords relatively light spring action during the early part of the compression of the shock absorbing member. The described action will continue until the spring follower E engages the partition wall 24 of the casing A, whereupon the casing will be forced rearwardly in unison with the spring follower E. As the casing is forced rearwardly, the wedge block B will be moved inwardly relatively to the casing A, thereby setting up a wedging action between the wedge block and the shoes C and forcing the shoes C inwardly on the friction surfaces of the liners 20. The inward movement of the friction means comprising the shoes C—C and the wedge block B is resisted by both the inner and outer coils of the two twin arranged spring resistance elements D during the remainder of the compression stroke. The compression action of the shock absorber will continue until the rear end of the casing A engages the abutment 27 of the buffer pocket, whereupon the actuating force will be transmitted directly through the casing A, the latter acting as a solid column load transmitting member to prevent undue compression of the spring resistance elements D.

Upon release, when the actuating force transmitted by the stem 14 is reduced, the initial action will be an outward movement of the spring follower E due to the expansive action of the springs 33. In this connection, it is pointed out that there is thus always provided an available free spring action after initial release of the shock absorber. During the continued releasing action outward movement of the spring follower E will be limited by engagement thereof with the abutments 23 of the casing A. Upon movement of the spring follower E being limited, as described, the further expansive action of the springs 33 and the tendency of the springs 34 to expand also will return the friction means including the shoes C—C and the wedge block B to the normal position shown in Figure 2. As will be evident, outward movement of the entire friction means is limited by the wedge block B which is anchored to the spring follower F by the retainer bolt H, outward movement of the spring follower F being limited by engagement with the liners 20, as hereinbefore pointed out.

While I have herein shown and described what I now consider the preferred manner of carrying out my invention, the same is merely illustrative and I contemplate all changes and modifications that come within the scope of the claims appended hereto.

I claim:

1. In a buffing mechanism, the combination with an inner abutment; of a stem adapted to transmit the buffing shocks; a casing provided with interior friction surfaces; friction means cooperating with the casing friction surfaces, said friction means including a wedge member bearing on the inner abutment; twin spring resistance means within the casing, each of said twin spring resistance means including a spring element interposed between the buffer stem and the friction system; a spring follower cooperating with said buffer stem and spring elements; and means on the casing limiting inward movement of the spring follower with respect to the casing.

2. In a shock absorber for buffing mechanisms, including an inner abutment and a stem adapted to transmit the buffing forces, the combination with a casing having interior friction surfaces at one end and abutment means adjacent the other end thereof; friction means cooperating with the friction surfaces of the casing, said friction means including wedge means bearing on said inner abutment; spring follower means at the end of the casing provided with the abutment means, said spring follower having its movement inwardly of the casing limited by said abutment means; and twin arranged spring resistance elements within the casing, each element including two members, one member being interposed between the abutment means and the friction means and the other member being interposed between the spring follower and the friction means.

3. In a shock absorber for buffing mechanisms, the combination with a casing having interior friction surfaces at one end and abutment means at the other end thereof; friction means cooperating with the friction surfaces of the casing; a spring follower at the end of the casing provided with the abutment and movable toward and away from said abutment, inward movement with respect to the casing being limited by said abutment; twin arranged spring resistance elements, each including an inner and an outer coil, the inner coil being interposed between the spring follower and the friction means and the outer coil being interposed between the abutment and the friction means.

4. In a shock absorber for buffing mechanisms, the combination with a casing having a friction shell section at one end thereof; of spring follower means at the other end of the casing, said spring follower means having limited movement inwardly of the casing, said spring follower being adapted to receive the actuating force; abutment means for limiting inward movement of said spring follower; friction means cooperating with the friction shell section of the casing, said friction means including a pressure transmittting spreading element; and twin arranged spring resistance elements within the casing, each element including inner and outer members, one of said members of each element being interposed between the spring follower and the friction means and the other member of said element being interposed between the abutment means and said friction means.

In witness that I claim the foregoing I have hereunto subscribed my name this 26th day of July, 1927.

HARVEY J. LOUNSBURY.